(12) United States Patent
Johnson et al.

(10) Patent No.: US 12,521,024 B2
(45) Date of Patent: Jan. 13, 2026

(54) SYSTEM AND METHOD FOR CARDIAC PRESSURE MEASUREMENT

(71) Applicant: BOARD OF REGENTS OF THE UNIVERSITY OF TEXAS SYSTEM, Austin, TX (US)

(72) Inventors: Daniel Johnson, Houston, TX (US); Richard L. Kirkeeide, Kingwood, TX (US); Bernard De Bruyne, Brussels (BE); K. Lance Gould, Houston, TX (US); Nils Johnson, Houston, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 962 days.

(21) Appl. No.: 17/764,360

(22) PCT Filed: Sep. 25, 2020

(86) PCT No.: PCT/US2020/052624
§ 371 (c)(1),
(2) Date: Mar. 28, 2022

(87) PCT Pub. No.: WO2021/062086
PCT Pub. Date: Apr. 1, 2021

(65) Prior Publication Data
US 2022/0338742 A1    Oct. 27, 2022

Related U.S. Application Data

(60) Provisional application No. 62/907,174, filed on Sep. 27, 2019.

(51) Int. Cl.
*A61B 5/021*    (2006.01)
*A61B 5/00*    (2006.01)
*A61B 5/0215*    (2006.01)

(52) U.S. Cl.
CPC .......... *A61B 5/021* (2013.01); *A61B 5/02158* (2013.01); *A61B 5/7203* (2013.01); *A61B 2562/0247* (2013.01); *A61B 2562/168* (2013.01)

(58) Field of Classification Search
CPC ... A61B 5/021; A61B 5/02158; A61B 5/7203; A61B 5/0208; A61B 2562/0247; A61B 2562/168
See application file for complete search history.

(56) References Cited

U.S. PATENT DOCUMENTS 6,290,652 B1    9/2001  Wellnhofer
9,314,584 B1 *  4/2016  Riley ................. A61B 5/021
(Continued)

FOREIGN PATENT DOCUMENTS

DE    3927990 A1    2/1991

OTHER PUBLICATIONS

International Search Report issued in counterpart International Application No. PCT/2020/052624, Mailed on Dec. 17, 2020.
(Continued)

*Primary Examiner* — Sean P Dougherty
*Assistant Examiner* — Dakota R. Sabotka
(74) *Attorney, Agent, or Firm* — Shackelford, McKinley & Norton, LLP

(57) ABSTRACT

A method for measuring cardiac pressure includes positioning a fluid-filled catheter and a pressure wire sensor at a cardiac pressure calibration location. A first pressure measurement is acquired from the fluid-filled catheter and a second pressure measurement is acquired from the pressure wire sensor. A set of equalization parameters is identified to apply to the first pressure measurement to reduce an error between the first pressure measurement and the second pressure measurement. The equalization parameters include
(Continued)

a frequency correction parameter and a damping correction parameter to correct for frequency and damping of oscillations in the first pressure measurement. A third pressure measurement is acquired from the fluid-filled catheter. The set of equalization parameters is applied to equalize the third pressure measurement.

16 Claims, 7 Drawing Sheets

(56) References Cited

U.S. PATENT DOCUMENTS

| | | |
|---|---|---|
| 2004/0024294 A1 | 2/2004 | Wellnhofer |
| 2007/0124127 A1 | 5/2007 | Danehorn et al. |
| 2014/0094697 A1* | 4/2014 | Petroff ............... A61B 1/015 600/427 |
| 2017/0071486 A1* | 3/2017 | Belleville ............ A61B 5/6852 |
| 2018/0279886 A1 | 10/2018 | Billiet |

OTHER PUBLICATIONS

Donald L. Fry. Physiologic Recording by Modern Instruments With Particular Reference to Pressure Recording. Physiological Reviews. Oct. 1960. vol. 40, Issue 4. pp. 753-788.

* cited by examiner

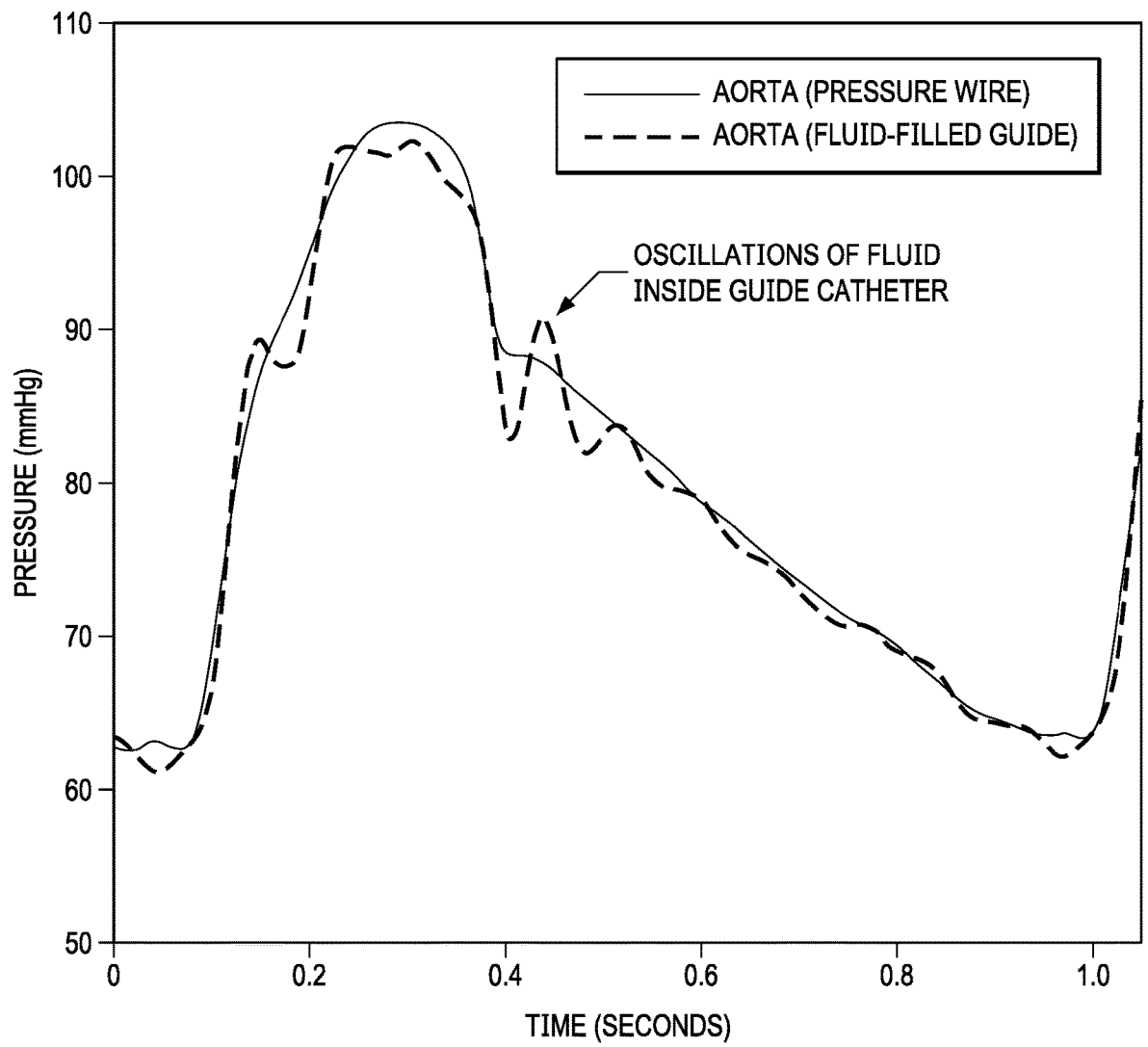

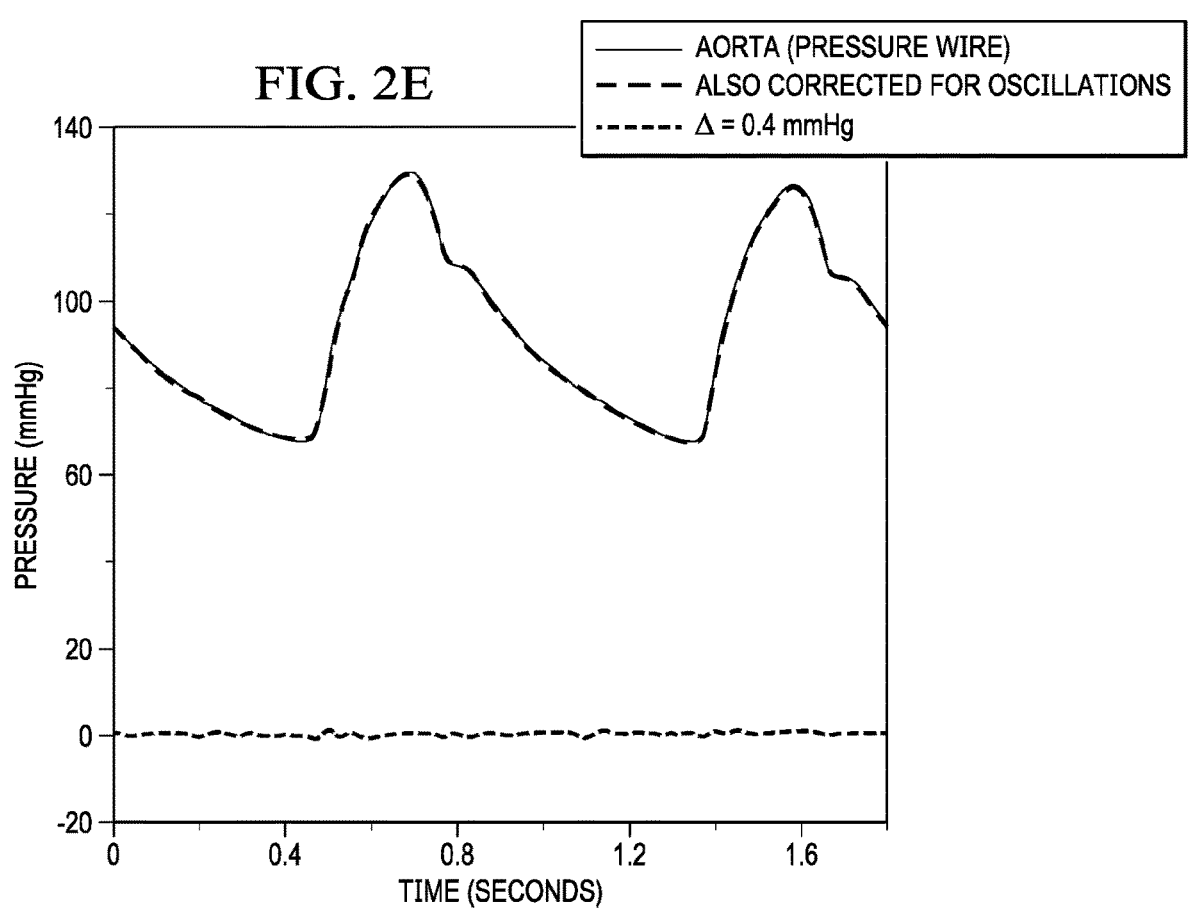
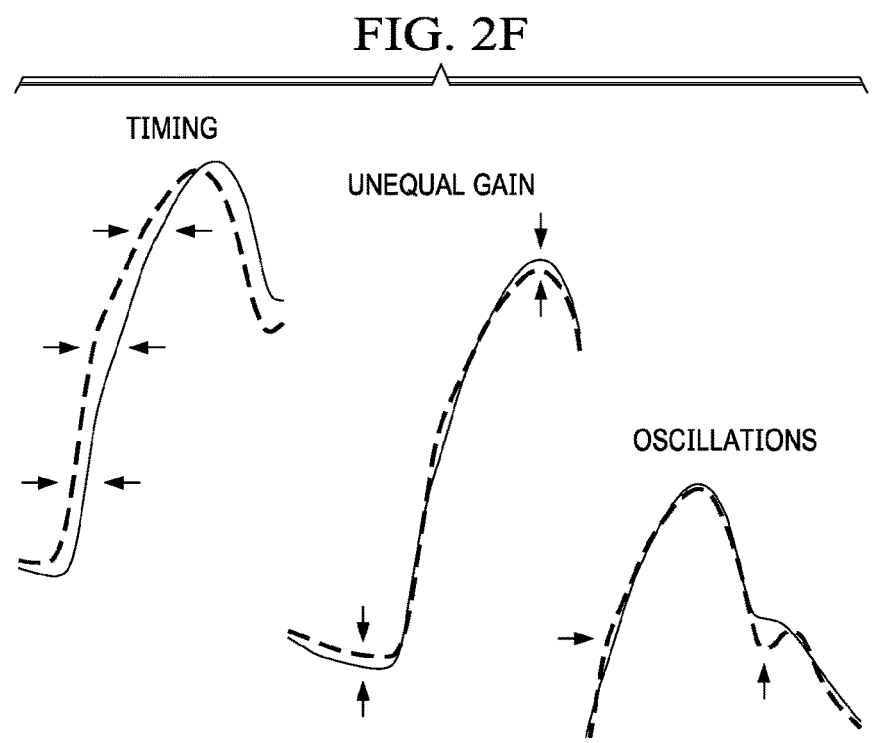

SYSTEM AND METHOD FOR CARDIAC PRESSURE MEASUREMENT

BACKGROUND

Effective coronary and valvular interventions rely on accurate hemodynamic assessment. Pressure measurements within the cardiovascular system can be made with access through a fluid-filled catheter. Comparison of pressures at two places is common, and for typical clinical purposes the average pressure over several cardiac cycles (heartbeats) is the norm. However, phasic (subcycle) indexes remain intrinsic to valvular stenosis and are emerging for coronary stenosis. Errors, corrections, and clinical implications of fluid-filled catheter phasic pressure assessments have not been assessed in the current era of ubiquitous, high-fidelity pressure wire sensors.

SUMMARY

In one embodiment, a method for measuring cardiac pressure includes positioning a fluid-filled catheter and a pressure wire sensor at a cardiac pressure calibration location. A first pressure measurement is acquired from the fluid-filled catheter and a second pressure measurement is acquired from the pressure wire sensor. A set of equalization parameters is identified to apply to the first pressure measurement to reduce an error between the first pressure measurement and the second pressure measurement. The equalization parameters include a frequency correction parameter and a damping correction parameter to correct for frequency and damping of oscillations in the first pressure measurement. A third pressure measurement is acquired from the fluid-filled catheter. The set of equalization parameters is applied to equalize the third pressure measurement. The set of equalization parameters may also include an offset correction parameter that corrects for a difference in offset of the first pressure measurement and the second pressure measurement, a timing correction parameter that corrects for a difference in timing of the first pressure measurement and the second pressure measurement, and/or a gain correction parameter that corrects for a difference in amplitude of the first pressure measurement and the second pressure measurement. Applying the set of equalization parameters may include applying a deconvolution to the third pressure measurement with an impulse response that includes the frequency correction parameter and the damping correction parameter. The method may also include repositioning the pressure wire sensor away from the cardiac pressure calibration location prior to acquiring the third pressure measurement from the fluid filled catheter. The method may also include applying the set of equalization parameters to the first pressure measurement to produce a first equalized pressure measurement, and computing a first pressure difference as a difference of the first equalized pressure measurement and the second pressure measurement. The method may also include identifying a second set of equalization parameters to apply to the first pressure measurement, applying the second set of equalization parameters to the first pressure measurement to produce a second equalized pressure measurement, computing a second pressure difference as a difference of the second equalized pressure measurement and the second pressure measurement, and comparing the first pressure difference to the second pressure difference.

In another embodiment, a system for measuring cardiac pressure includes a fluid-filled catheter and a processor. The processor is coupled to the fluid-filled catheter, and configured to acquire a first pressure measurement from the fluid-filled catheter. The processor is also configured to identify a set of equalization parameters to apply to the first pressure measurement to reduce an error between the first pressure measurement and a second pressure measurement produced by a pressure wire sensor. The equalization parameters include a frequency correction parameter and a damping correction parameter to correct for frequency and damping of oscillations in the first pressure measurements. The processor is further configured to acquire a third pressure measurement from the fluid-filled catheter, and equalize the third pressure measurement using the set of equalization parameters. The set of equalization parameters may also include an offset correction parameter that corrects for a difference in offset of the first pressure measurement and the second pressure measurement, a timing correction parameter that corrects for a difference in timing of the first pressure measurement and the second pressure measurement, and/or a gain correction parameter that corrects for a difference in amplitude of the first pressure measurement and the second pressure measurement. The processor may also be configured to apply a deconvolution to the third pressure measurement with an impulse response that includes the frequency correction parameter and the damping correction parameter to equalize the third pressure measurement. The processor may also be configured to apply the set of equalization parameters to the first pressure measurement to produce a first equalized pressure measurement, and compute a first pressure difference as a difference of the first equalized pressure measurement and the second pressure measurement. The processor may also be configured to identify a second set of equalization parameters to apply to the first pressure measurement, apply the second set of equalization parameters to the first pressure measurement to produce a second equalized pressure measurement, compute a second pressure difference as a difference of the second equalized pressure measurement and the second pressure measurement, and compare the first pressure difference to the second pressure difference.

In a further embodiment, a non-transitory computer-readable medium encoded with instructions that when executed cause a processor to acquire a first pressure measurement from a fluid-filled catheter and a second pressure measurement from a pressure wire sensor. The instructions also cause the processor to identify a set of equalization parameters to apply to the first pressure measurement to reduce an error between the first pressure measurement and the second pressure measurement. The equalization parameters include a frequency correction parameter and a damping correction parameter to correct for frequency and damping of oscillations in the first pressure measurement. The instructions further cause the processor to acquire a third pressure measurement from the fluid-filled catheter, and apply the set of equalization parameters to equalize the third pressure measurement. The instructions may also cause the processor to apply the set of equalization parameters to the first pressure measurement to produce a first equalized pressure measurement, and compute a first pressure difference as a difference of the first equalized pressure measurement and the second pressure measurement. The instructions may also cause the processor to identify a second set of equalization parameters to apply to the first pressure measurement, apply the second set of equalization parameters to the first pressure measurement to produce a second equalized pressure measurement, compute a second pressure difference as a difference of the second equalized pressure measurement and the second pressure measurement and compare the first pressure difference to the second pressure difference. The instructions may also cause the processor to apply a deconvolution to the third pressure measurement with an impulse response that includes the frequency correction parameter and the damping correction parameter to equalize the third pressure measurement. The set of equalization parameters may also include an offset correction parameter that corrects for a difference in offset of the first pressure measurement and the second pressure measurement, a timing correction parameter that corrects for a difference in timing of the first pressure measurement and the second pressure measurement, and/or a gain correction parameter that corrects for a difference in amplitude of the first pressure measurement and the second pressure measurement.

BRIEF DESCRIPTION OF THE DRAWINGS

For a detailed description of various examples, reference will now be made to the accompanying drawings in which:

FIG. 1 shows an example of distortions in a pressure signal from a fluid-filled catheter due to oscillations of the fluid;

FIG. 2E shows an example of the difference in pressure signals acquired using a fluid-filled catheter and a pressure wire after offset, timing, gain, and oscillation frequency and damping correction;

FIG. 2F shows detail of the timing, gain, and oscillation corrections of FIGS. 2C-2E;

DETAILED DESCRIPTION

Figure 2A:
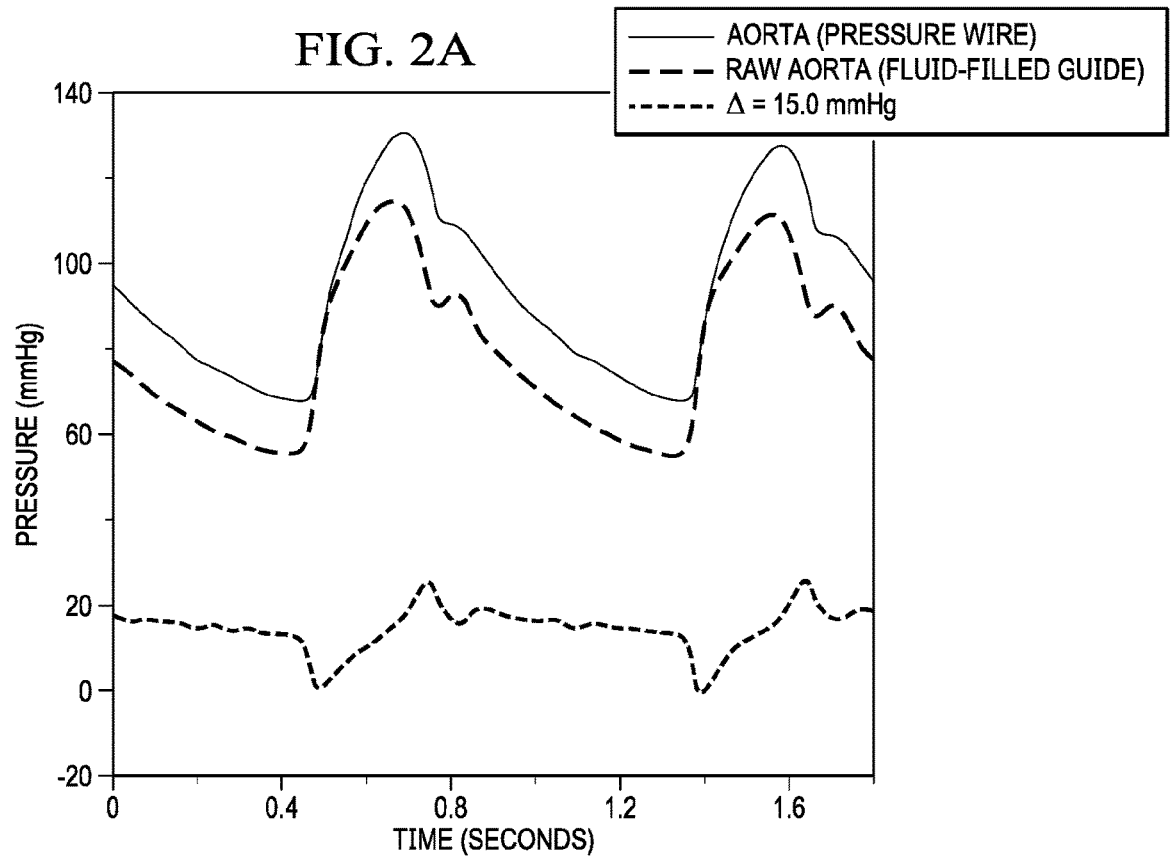
FIG. 2A shows an example of the difference in raw pressure signals acquired using a fluid-filled catheter and a pressure wire.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

Appropriate patients for intervention on coronary or aortic stenosis require physiologic necessity. Namely, whether the severity reaches a level that warrants a therapeutic procedure must be determined. While non-invasive physiologic imaging for either of these two pathologies can often provide sufficient quantification, many cases undergo or demand invasive pressure assessment. For coronary stenosis, established fractional flow reserve (FFR) has been joined by non-hyperemic pressure ratios (NHPR). For aortic stenosis, the mean transvalvular pressure gradient ($\Delta P$) remains classic, with emerging data for the stress aortic valve index (SAVI).

A variety of invasive tools can measure pressure but offer tradeoffs. On the one hand, any measurement system that crosses a stenosis will create an iatrogenic gradient, both for coronary and valvular lesions. Smaller devices bias the gradient less than larger devices. On the other hand, smaller diameter, fluid-filled systems do not provide high-fidelity phasic waveforms required by certain types of subcycle metrics like NHPR, $\Delta P$, and SAVI. Hence historic 2F (⅔ millimeter diameter) microcatheters and 0.015" fluid-filled wires gave way to modern, high-fidelity 0.014" piezoelectric or fiberoptic pressure wires for coronary physiology. While most aortic valve assessment uses single- or dual-lumen pigtail catheters, high-fidelity micromanometers have found limited clinical uptake, in contrast to repurposing coronary pressure wires for valvular assessment.

Given that invasive physiology often acts as the final gatekeeper for coronary revascularization or valve implantation, a biased or faulty measurement can lead to adverse clinical consequences when accounting for the peri-procedural risk of any device therapy. Ideally a second identical pressure wire would be inserted to measure aortic pressure, in addition to the pressure wire in the distal coronary artery or left ventricle. However, because of the added cost and logistical complexity of introducing two simultaneous pressure wires, the aortic tracing comes from the guiding catheter. Although the guiding catheter contributes half of the signal used to quantify the stenotic gradient, calibration of the guiding catheter is generally less than ideal. Embodiments of the present disclosure provide improved pressure measurement performance by applying the pressure wire to better calibrate the fluid-filled catheter. In doing so, embodiments provide a novel, robust, and automatic technique to correct for errors commonly present in phasic pressure measurements.

Some embodiments disclosed herein correct the pressure signal from a fluid-filled catheter using a high-fidelity pressure wire (e.g., a 0.014" pressure wire) as the reference. The pressure wire provides the superior reference between the two pressure signals given its per-wire customized pressure calibration and greater fidelity, as reflected in the roughly 3-fold higher cost of the pressure wire versus the transducer for a fluid-filled manifold.

Embodiments disclosed herein extract extra information during the standard equalization performed between the fluid-filled guide catheter and pressure wire. Applying the measurements, embodiments can match phasic aortic signals within 1 mmHg root mean square error, and this high level of agreement can be maintained during typical clinical assessments. Unlike existing algorithms that focus on static pressure offset (equivalent to raising or lowering the height of the manifold transducer), embodiments additionally account for timing differences (due to mechanical delays, electronic delays or signal processing), differential gain (between the manifold transducer and pressure wire sensors), and harmonic oscillator behavior of the fluid-filled catheter. Together, these factors improve the fidelity of the aortic signal—almost as if using a second pressure wire—without additional cost and extra effort by the operator who can proceed with the diagnostic procedure in usual fashion.

Figure 2B:
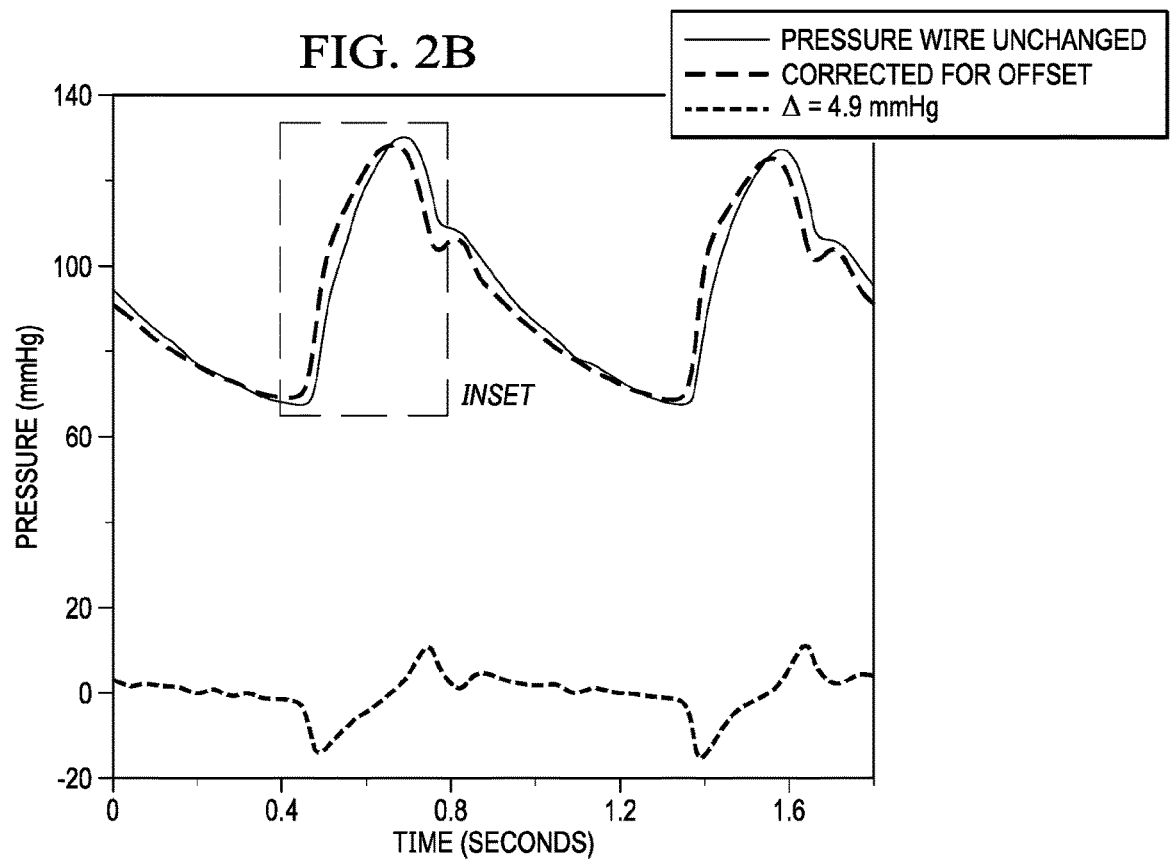
FIG. 2B shows an example of the difference in pressure signals acquired using a fluid-filled catheter and a pressure wire after offset correction.
Figure 2C:
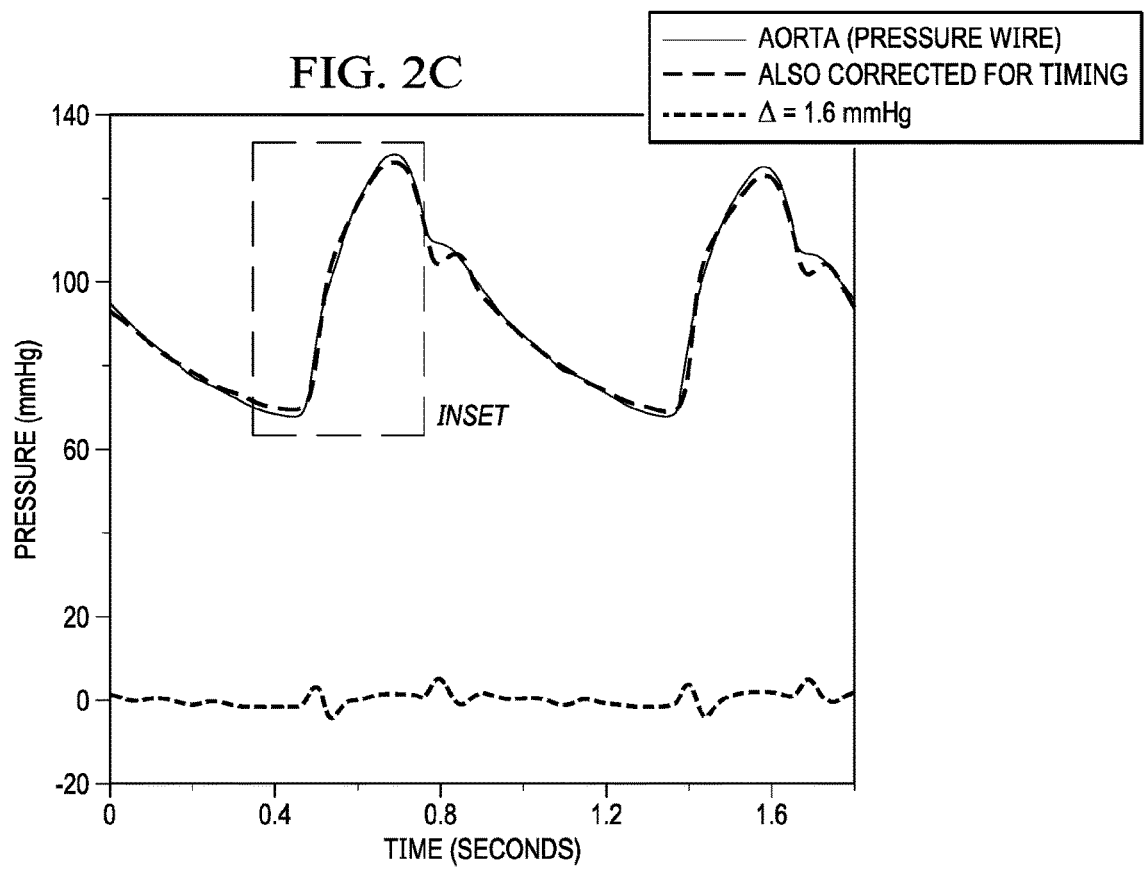
FIG. 2C shows an example of the difference in pressure signals acquired using a fluid-filled catheter and a pressure wire after offset and timing correction.
Figure 2D:
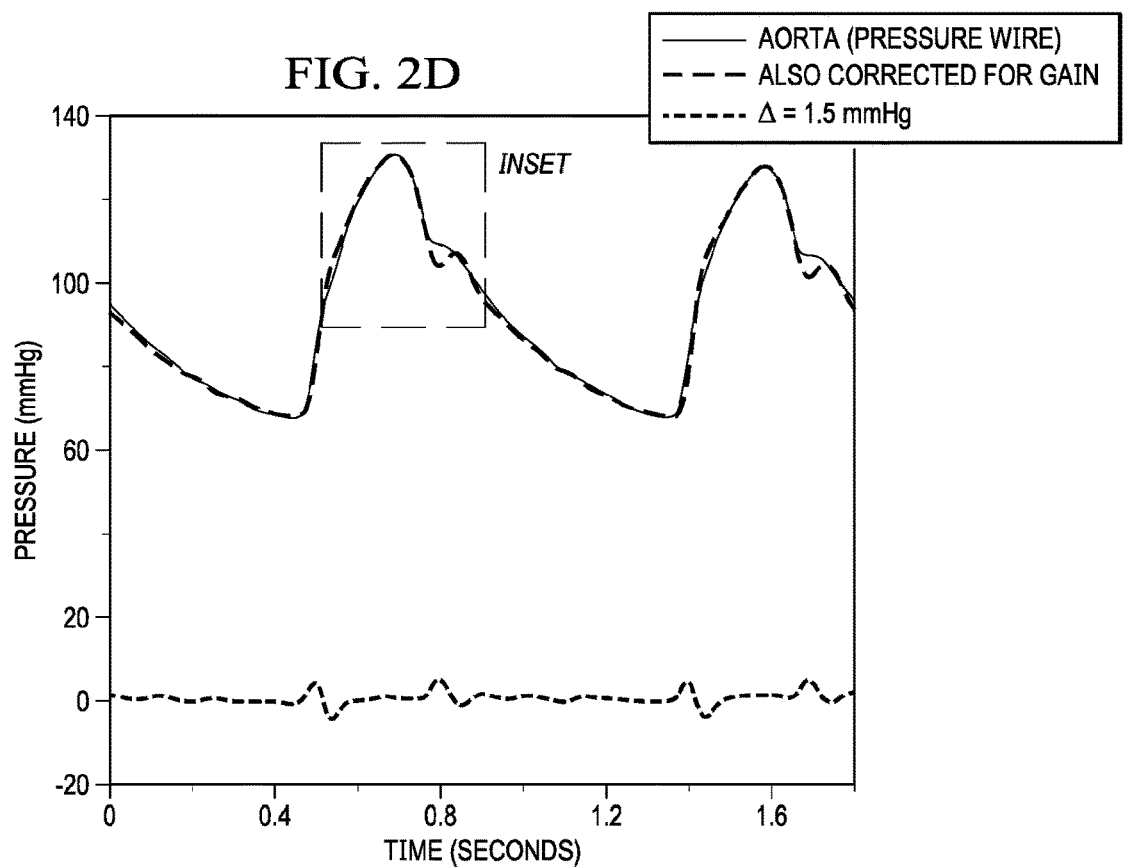
FIG. 2D shows an example of the difference in pressure signals acquired using a fluid-filled catheter and a pressure wire after offset, timing, and gain correction.

FIG. 1 shows an example of distortions in a pressure signal from a fluid-filled catheter due to oscillations of the fluid. To match the pressure signal from a fluid-filled catheter against the reference pressure wire, embodiments of the present disclosure apply the series of operations illustrated in FIGS. 2A-2F. FIG. 2A shows raw pressure measurements by the pressure wire and the fluid-filled catheter. Root mean square (RMS) difference in grey equals about 15 mmHg. In FIG. 2B, embodiments remove pressure offset to obtain agreement of the measurement averages. With the offset correction, the mean pressures become equal and the RMS difference falls to approximately 5 mmHg. In FIG. 2C, the timing of the measurement signals is adjusted to compensate for differences due to heterogeneous electronic processing and delays. Matching the timing of the two tracings reduces their RMS difference to about 1.6 mmHg. In FIG. 2D, embodiments correct the measurement signals for differential gain caused by each sensor having unique signal-to-pressure calibration (for example, a pressure increase of 10 mmHg for one sensor might produce an increase of 11 mmHg for the other sensor). Gain correction brings the RMS difference down to about 1.5 mmHg. In FIG. 2E, embodiments remove oscillations from the fluid-filled catheter after quantifying the frequency and damping (how quickly oscillations disappear) of the oscillations. Removing the oscillations brings the RMS difference well below 1 mmHg. FIG. 2F shows detail of the timing, gain, and oscillation corrections. Thus, embodiments apply 5 parameters (offset, timing, gain, harmonic oscillator frequency and damping) for correcting the pressure signals from the fluid-filled catheter.

Embodiments compute the error difference between the corrected catheter and the wire, and use its root mean square (RMS) value as an objective measure to fit the model to the data. Model parameters are derived by a non-linear optimization of this RMS error, performed for each beat of a baseline recording when the sensors are located together (i.e., disposed at a same location). Data from all the baseline beats may be reduced by taking the median value of each of the 5 parameters for the best beats, those whose RMS error falls below its median (the 50% of valid beats with smallest RMS error).

Figure 3:
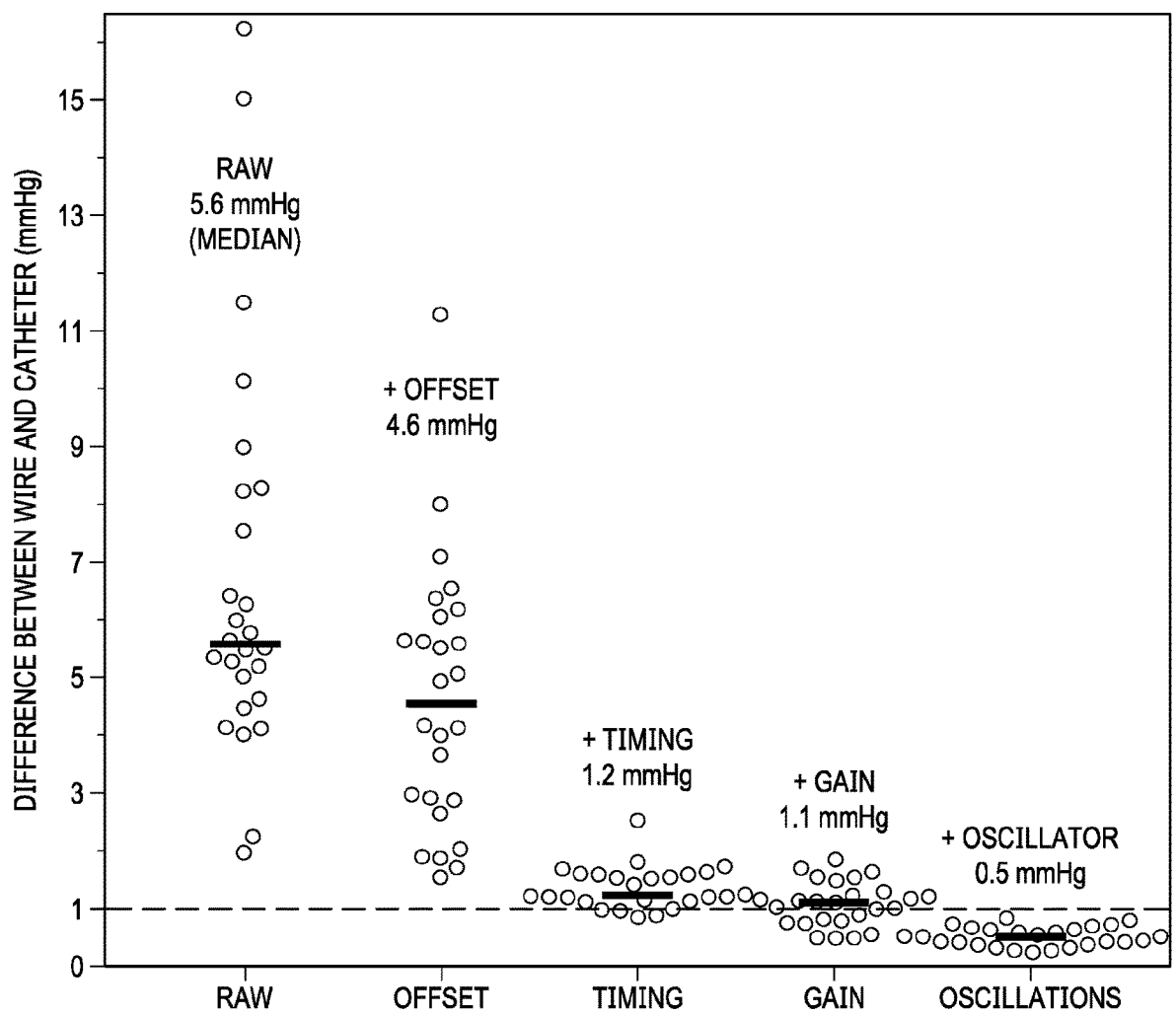
FIG. 3 shows root mean square (RMS) error between a pressure wire and a fluid-filled catheter for progressive, step-wise corrections as in FIGS. 2A-2E applied to a sample of different patients with a trial protocol.

FIG. 3 displays the RMS error between the pressure wire and fluid-filled catheter for progressive, step-wise corrections as in FIGS. 2A-2E. Compared to the raw tracing median RMS error of 5.6 mmHg, matching the average pressure offset decreased the median error to 4.6 mmHg, and adjusting for timing shift further decreased median error further to 1.2 mmHg. These two steps provided the largest absolute improvements. However, additional adjustments for differential gain (median error decreased further to 1.1 mmHg) as well as the harmonic oscillator behavior of the fluid-filled system brought the median error to 0.52 mmHg after all 5 model parameters were included.

Figure 4:
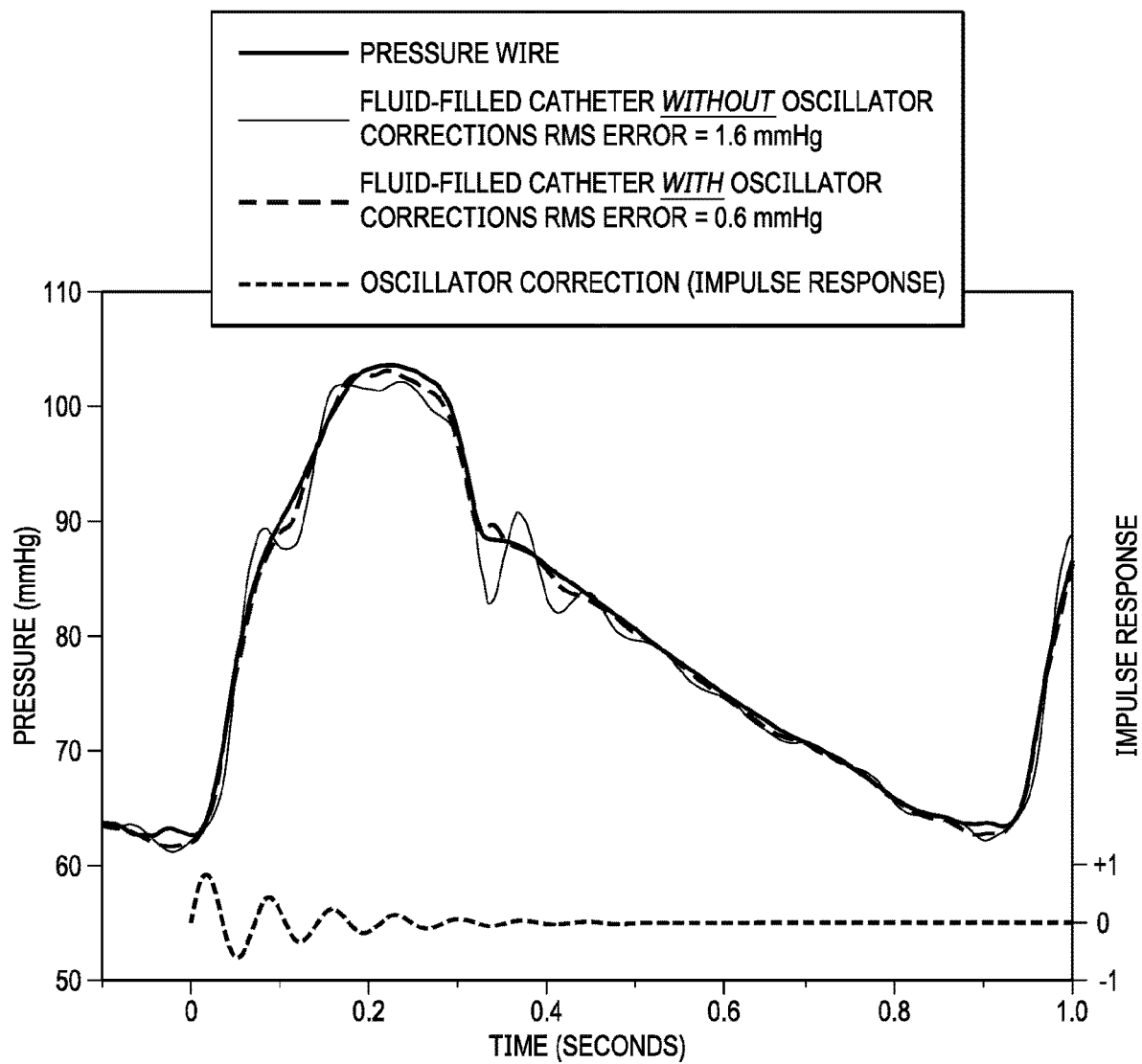
FIG. 4 shows an example of pressure signals acquired using a pressure wire and a fluid filled catheter with and without correction for fluid oscillations, indicating the inferred impulse response of the catheter measurement.

Returning now to the oscillation correction, cardiac catheter pressure measurement systems behave like a damped harmonic oscillator. Such oscillators are characterized by two parameters, frequency and damping. A pressure impulse at the input results in a sinusoidal oscillation whose amplitude decays exponentially at the output, as shown in FIG. 4. The catheter pressure transducer output can be modeled as the input pressure convolved with the damped harmonic impulse response. Knowing two damped oscillator parameters (frequency and damping), deconvolution can be used to derive the input pressure from the output of the catheter pressure transducer. In FIG. 4, this improvement reduces the root mean square (RMS) error from 1.6 to 0.6 mmHg.

The convolution model is a mathematical theory for understanding the distortions introduced in a pressure measurement. If one assumes an undistorted pressure measurement, a convolution process can be applied to compute a distorted measurement with specified parameters. For each sample of an input digital trace, the corresponding impulse response sample is multiplied by the input sample and added to the modeled output trace. This has the effect of spreading a single input sample p[i] at time t[i] over a time interval from t[(i] to a later time t[i+w] if the impulse response has a width of w samples. While w is mathematically infinite, the exponential decay (damping) of amplitude means that in practice the computation can be limited to something typically less than a heartbeat, as can be inferred from FIG. 4 where the impulse response visually disappears after about half a second.

Deconvolution is the inverse of convolution. This is what we need, since we want to begin with the distorted trace and correct it, rather than begin with the undistorted trace and introduce distortion. Some embodiments perform convolution and deconvolution in the frequency domain using discrete Fourier transform techniques. The frequency amplitude samples are complex numbers with real and imaginary parts. In the frequency domain, convolution becomes multiplication of frequency components and deconvolution is division, more straightforward to understand than deconvolution without Fourier transforms. There is no spreading of one frequency into others, as there is for convolution in the time domain. If deconvolution is applied to the catheter pressure trace, it can be made to match the pressure wire more closely during equalization, when the two sensors are in the same place and should be sensing the same pressure.

Deconvolution can also be done without frequency transforms. From the convolution impulse response, an embodiment can derive an inverse filter function which can be convolved with a trace to deconvolve it. Unlike the impulse response which can be quite long and ringy if the damping is small, the inverse filter is short, only 3 samples, so it can be applied easily, although with actual pressure trace data intolerable noise appears and must be suppressed.

Prior to deconvolution, embodiments apply other operations to catheter and wire pressure traces to "zero" both systems. Using the wire pressure as the reference, the first fit parameter is an offset constant added to the catheter to make its average pressure equal the wire average pressure. To go beyond matching average pressures, it is helpful to work with the residual difference between the two systems and minimize its RMS error value over some interval like a heartbeat. The second fit parameter making a significant change to the RMS error is a time shift, for example, the catheter pressure may lead the wire by about 20 milliseconds. Applying a time shift reduces the RMS error as shown in FIG. 3. The third fit parameter quantifies the relative gain of the two pressure sensors. Once the time shift and deconvolution are applied, the gain and revised offset parameters can be determined by linear regression. Embodiments can perform the operations in a different order, or combine them into a single convolution (deconvolution) computation.

Embodiments may apply a straightforward bisection search technique to optimize RMS error by a parameter like time shift. If the heartbeat is regular, the time shift search may not give a unique solution since shifting by a whole beat (or several beats) gives a small RMS error, smaller than if the shift is half a beat putting the traces out of phase. To avoid this local versus global minimum issue and to get some statistics on the result, embodiments can perform the search on a beat by beat basis. Subsample interpolation maybe be used to refine the time shift.

Embodiments may extend the bisection search optimization of RMS error technique to search for the harmonic oscillator parameters as well as time shift, a multidimensional search for all 3 parameters. Search methods need a starting point, and for time shift, 0 is one choice, allowing additive steps into positive or negative values with a starting step size of one sample. The harmonic parameters of frequency and damping however cannot be negative, and geometric steps are more appropriate. An embodiment with starting values of 10 Hz, 0.5 damping, and steps of ±10% is suitable. The search generally converges to within ±1% of RMS error in less than 100 iterations. On each iteration, embodiments apply the 3 parameters being searched along with linear regression to get the other 2 parameters (offset and gain), and compute the RMS error. In various embodiments, coronary tracings, each about 30 seconds long, can be analyzed in less than 10 seconds on a common laptop computer.

In one embodiment, the process removes bad data or beats (of the pressure wire sensor pressure measurements) contaminated by atypical noise, with traces (of the pressure wire sensor pressure measurements) first marked up to indicate the start of each beat and its quality. For each acquired baseline trace, bad beats are eliminated, and a median cutoff is used to select half of the remaining beats with the smaller RMS errors. Among these selected beats, the median of each of the 5 parameters is chosen to represent the best fit.

Figure 5:
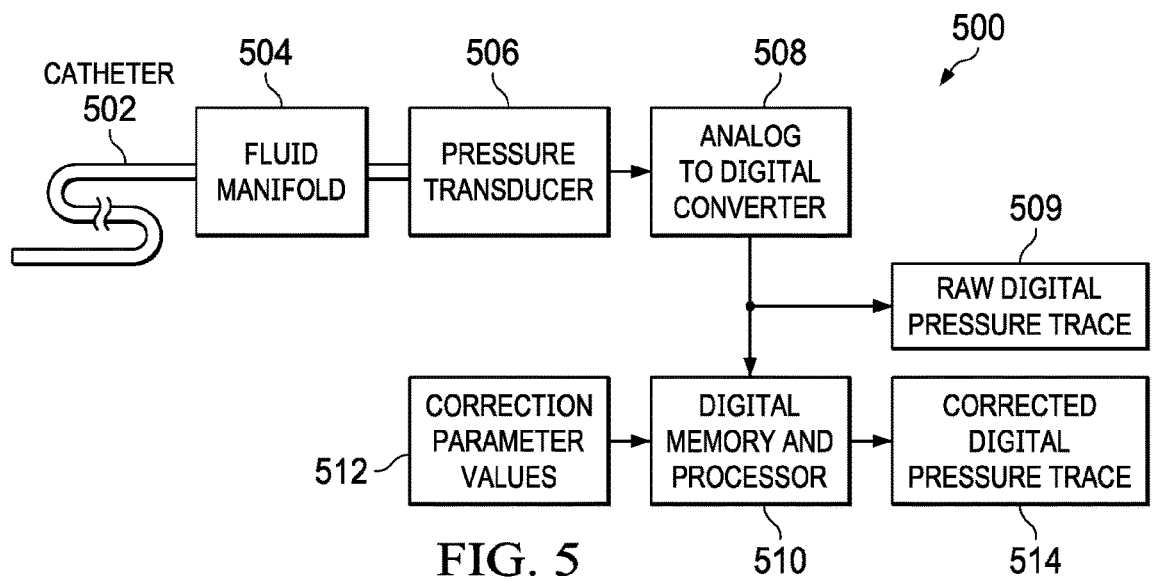
FIG. 5 shows an example system for correcting distortions in pressure measurements made with a fluid-filled catheter.

FIG. 5 shows a block diagram for an example system 500 for measuring pressure using a fluid-filled catheter with the method of the present disclosure. The system 500 includes a fluid-filled catheter 502, a fluid manifold 504, a pressure transducer 506 that produces an electrical signal output from the fluid mechanics, and an analog to digital converter 508 that outputs digital samples at regular time intervals. The transducer 506 and digital converter 508 may include amplifiers, filters, other electronic circuits and digital signal processing.

The digital pressure trace samples are received by the computer processor 510. This processor is coupled to sufficient memory for several seconds of pressure samples as needed for time shifting, filtering and deconvolution. A set 512 of 5 parameter values is supplied to the processor. These 5 values are: 1) offset, a value added to each sample after it is multiplied by 2) gain, which can be used to scale the samples values to a standard unit of pressure; 3) time shift in units of sample interval, as a floating point number to allow shifts of fractions of a sample interval; 4) harmonic oscillator undamped frequency; and 5) harmonic oscillator damping factor. The digital memory and processor 510 may be embodied in a general-purpose device such as a desktop computer, a laptop computer, a rackmount computer, an embedded computer, or other form of computer suitable for providing the functionality disclosed herein. The result is a corrected catheter pressure trace 514.

Figure 6:
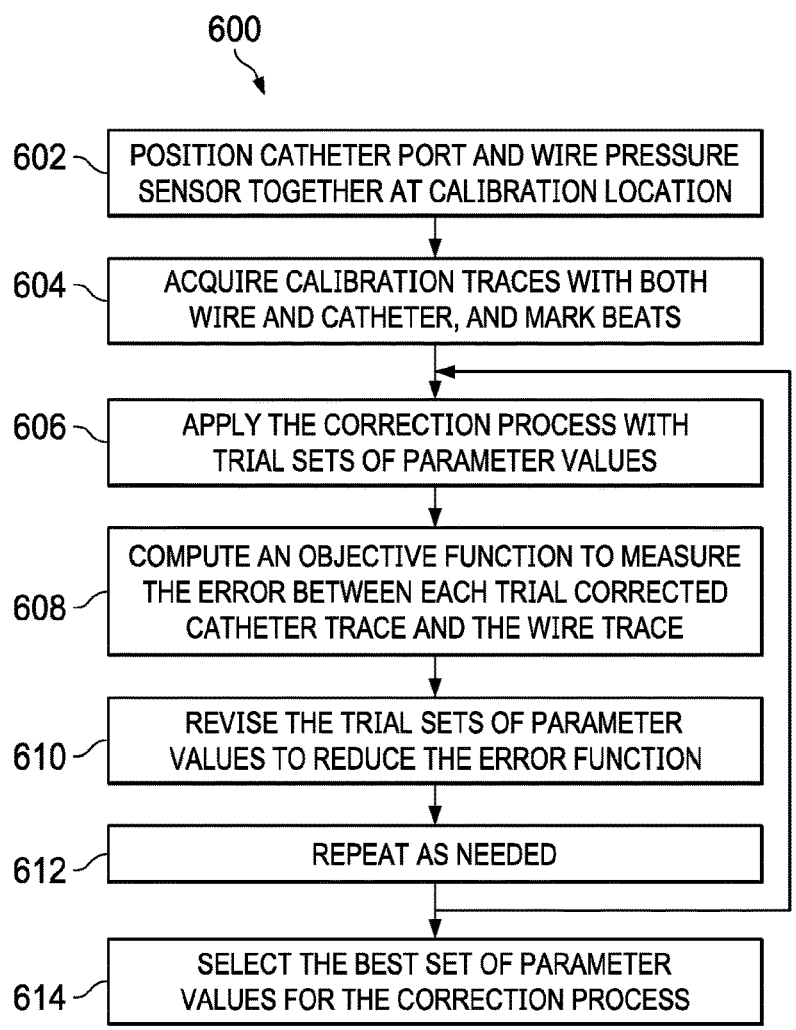
FIG. 6 shows a flow diagram of an example method for determining the five correction parameters used in the correction system of FIG. 5.

FIG. 6 shows a flow diagram for an example method 600 for measuring pressure using a fluid-filled catheter with the correction system 500 and parameters derived using an in-situ pressure wire sensor as a reference. Though depicted sequentially as a matter of convenience, at least some of the actions shown can be performed in a different order and/or performed in parallel, and the calibration trace may be broken into heartbeat segment for individual processing. Additionally, some implementations may perform only some of the actions shown. At least some operations of the process 600 may be performed by the system 500.

In block 602, the fluid-filled catheter 502 is positioned at the same location as an in-situ pressure wire sensor to be used for calibration. For example, the pressure wire and the fluid-filled catheter 502 are disposed to measure aortic pressure with the sensor of the pressure wire at an end port of the fluid-filled catheter 502.

In block 604, pressure measurements are acquired from the fluid-filled catheter 502 and the pressure wire while disposed at the calibration location to give simultaneous traces with a number of heartbeats sufficient for statistical reliability. Markup of data quality and heartbeats can be done in this block and allows separation into traces segments. Traces (of the pressure wire sensor pressure measurements) may be marked up to indicate the start of each beat and quality of each beat. For each acquired baseline trace, bad beats are eliminated, and a median cutoff is used to select a number (e.g., half) of the remaining beats with the smaller RMS errors.

In block 606, the system 500 of FIG. 5 is applied to the catheter pressure trace segments acquired in 604 with several sets of the 5 equalization parameter values to give several trial corrected catheter traces.

In block 608, each trial corrected catheter trace segment is compared to the reference pressure wire trace, to compute the value of an objective function that measures the error between the trial correction catheter trace and reference wire trace. An embodiment of the method uses heartbeat segments for statistical selection.

In block 610, the objective function values are used to revise the sets of trial parameter values to minimize the error between the corrected catheter traces and the reference pressure wire trace. An embodiment uses a multidimensional bisection method for 3 parameters, time shift, harmonic frequency, and harmonic damping.

In block 612, the sets of equalization parameters are tested to determine if more trials are needed and to repeat from block 606 as needed.

In block 614, a set of the 5 equalization parameters (offset, timing, gain, harmonic oscillator frequency and damping) is selected for use in correcting the catheter pressure measurements. Catheter pressure measurements are acquired and corrected, in the system 500 using the selected set of the 5 equalization parameters.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for measuring cardiac pressure, comprising:
positioning a fluid-filled catheter and a pressure wire sensor at a cardiac pressure calibration location;

acquiring a first pressure measurement from the fluid-filled catheter and a second pressure measurement from the pressure wire sensor;
applying a set of equalization parameters to the first pressure measurement to reduce an error between the first pressure measurement and the second pressure measurement, wherein the equalization parameters comprise:
a frequency correction parameter to correct for frequency of oscillations in the first pressure measurement,
a damping correction parameter to correct for damping of oscillations in the first pressure measurement,
an offset correction parameter that corrects for a difference in offset of the first pressure measurement and the second pressure measurement,
a timing correction parameter that corrects for a difference in timing of the first pressure measurement and the second pressure measurement, and
a gain correction parameter that corrects for a difference in amplitude of the first pressure measurement and the second pressure measurement;
acquiring a third pressure measurement from the fluid-filled catheter; and
applying the set of equalization parameters to equalize the third pressure measurement.

2. The method of claim 1, wherein applying the set of equalization parameters includes applying a deconvolution with an impulse response to the third pressure measurement, wherein the impulse response comprises the frequency correction parameter and the damping correction parameter.

3. The method of claim 1, further comprising moving the pressure wire sensor from the cardiac pressure calibration location prior to acquiring the third pressure measurement from the fluid filled catheter.

4. The method of claim 1, further comprising:
applying the set of equalization parameters to the first pressure measurement to produce a first equalized pressure measurement; and
computing a first pressure difference as a difference of the first equalized pressure measurement and the second pressure measurement.

5. The method of claim 4, wherein:
the set of equalization parameters is a first set of equalization parameters; and
the method includes:
identifying a second set of equalization parameters to apply to the first pressure measurement;
applying the second set of equalization parameters to the first pressure measurement to produce a second equalized pressure measurement;
computing a second pressure difference as a difference of the second equalized pressure measurement and the second pressure measurement; and
comparing the first pressure difference to the second pressure difference.

6. A system for measuring cardiac pressure, comprising:
a fluid-filled catheter;
a processor coupled to the fluid-filled catheter, and configured to:
acquire a first pressure measurement from the fluid-filled catheter;
apply a set of equalization parameters to the first pressure measurement to reduce an error between the first pressure measurement and a second pressure measurement produced by a pressure wire sensor, wherein the equalization parameters comprise:
a frequency correction parameter to correct for frequency of oscillations in the first pressure measurements,
a damping correction parameter to correct for damping of oscillations in the first pressure measurements,
an offset correction parameter that corrects for a difference in offset of the first pressure measurement and the second pressure measurement,
a timing correction parameter that corrects for a difference in timing of the first pressure measurement and the second pressure measurement, and
a gain correction parameter that corrects for a difference in amplitude of the first pressure measurement and the second pressure measurement;
acquire a third pressure measurement from the fluid-filled catheter; and
equalize the third pressure measurement using the set of equalization parameters.

7. The system of claim 6, wherein the processor is configured to apply a deconvolution with an impulse response to the third pressure measurement, wherein the impulse response comprises the frequency correction parameter and the damping correction parameter to equalize the third pressure measurement.

8. The system of claim 6, wherein the processor is configured to:
apply the set of equalization parameters to the first pressure measurement to produce a first equalized pressure measurement; and
compute a first pressure difference as a difference of the first equalized pressure measurement and the second pressure measurement.

9. The system of claim 8, wherein:
the set of equalization parameters is a first set of equalization parameters; and
the processor is configured to:
identify a second set of equalization parameters to apply to the first pressure measurement;
apply the second set of equalization parameters to the first pressure measurement to produce a second equalized pressure measurement; and
compute a second pressure difference as a difference of the second equalized pressure measurement and the second pressure measurement; and
compare the first pressure difference to the second pressure difference.

10. A non-transitory computer-readable medium encoded with instructions that when executed cause a processor to:
acquire a first pressure measurement from a fluid-filled catheter and a second pressure measurement from a pressure wire sensor;
apply a set of equalization parameters to the first pressure measurement to reduce an error between the first pressure measurement and the second pressure measurement, wherein the equalization parameters comprise:
a frequency correction parameter to correct for frequency and damping of oscillations in the first pressure measurement,
a damping correction parameter to correct for damping of oscillations in the first pressure measurement,
an offset correction parameter that corrects for a difference in offset of the first pressure measurement and the second pressure measurement,
a timing correction parameter that corrects for a difference in timing of the first pressure measurement and the second pressure measurement, and a gain correction parameter that corrects for a difference in amplitude of the first pressure measurement and the second pressure measurement;

acquire a third pressure measurement from the fluid-filled catheter; and apply the set of equalization parameters to equalize the third pressure measurement.

11. The non-transitory computer-readable medium of claim 10, wherein the instructions when executed cause the processor to:

apply the set of equalization parameters to the first pressure measurement to produce a first equalized pressure measurement; and compute a first pressure difference as a difference of the first equalized pressure measurement and the second pressure measurement.

12. The non-transitory computer-readable medium of claim 11, wherein the instructions when executed cause the processor to:

identify a second set of equalization parameters to apply to the first pressure measurement;

apply the second set of equalization parameters to the first pressure measurement to produce a second equalized pressure measurement;

compute a second pressure difference as a difference of the second equalized pressure measurement and the second pressure measurement; and compare the first pressure difference to the second pressure difference.

13. The non-transitory computer-readable medium of claim 10, wherein the instructions when executed cause the processor to apply a deconvolution with an impulse response to the third pressure measurement, wherein the impulse response comprises the frequency correction parameter and the damping correction parameter to equalize the third pressure measurement.

14. The method of claim 1, wherein the pressure wire sensor comprises a high-fidelity pressure wire sensor.

15. The system of claim 6, wherein the pressure wire sensor comprises a high-fidelity pressure wire sensor.

16. The non-transitory computer-readable medium of claim 10, wherein the pressure wire sensor comprises a high-fidelity pressure wire sensor.

* * * * *